United States Patent
Diviacchi et al.

(10) Patent No.: US 10,759,720 B1
(45) Date of Patent: Sep. 1, 2020

(54) LOW TOXICITY, ENVIRONMENTALLY FRIENDLY RED SMOKE GENERATING COMPOSITION AND METHOD OF MAKING THE SAME

(71) Applicant: U.S. Army Edgewood Chemical Biological Center, APG, MD (US)

(72) Inventors: Giancarlo Diviacchi, Baltimore, MD (US); Joseph A Domanico, Bel Air, MD (US); Joseph E May, Clermont, FL (US); David R Redding, Jarrettsville, MD (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 219 days.

(21) Appl. No.: 16/136,963

(22) Filed: Sep. 20, 2018

(51) Int. Cl.
| | | |
|---|---|---|
| *C06B 29/08* | (2006.01) | |
| *C06B 29/10* | (2006.01) | |
| *C06D 3/00* | (2006.01) | |
| *C06B 45/02* | (2006.01) | |
| *C06B 43/00* | (2006.01) | |
| *C06B 23/04* | (2006.01) | |
| *C06B 29/00* | (2006.01) | |
| *C06B 29/02* | (2006.01) | |
| *D03D 23/00* | (2006.01) | |
| *D03D 43/00* | (2006.01) | |
| *C09B 1/16* | (2006.01) | |

(52) U.S. Cl.
CPC .............. *C06D 3/00* (2013.01); *C06B 23/04* (2013.01); *C06B 29/10* (2013.01); *C06B 43/00* (2013.01); *C06B 45/02* (2013.01); *C09B 1/16* (2013.01)

(58) Field of Classification Search
USPC ....... 149/75, 77, 83, 84, 108.4, 109.4, 109.6
See application file for complete search history.

(56) References Cited

U.S. PATENT DOCUMENTS

| | | | | |
|---|---|---|---|---|
| 3,717,517 A | * | 2/1973 | Jankowiak | C06B 29/10 149/19.1 |
| 3,964,255 A | * | 6/1976 | Catanzarite | C06B 29/08 60/205 |
| 2016/0115090 A1 | * | 4/2016 | Moretti | C06D 3/00 102/334 |

\* cited by examiner

*Primary Examiner* — James E McDonough
(74) *Attorney, Agent, or Firm* — Ulysses John Biffoni

(57) ABSTRACT

The present invention is directed to a novel, low-toxicity red smoke generating composition and a method of making the same, comprising at least one red dye, a coolant, an oxidizer, a non-sugar binder, and a non-sulfur particulate fuel that is also a burn-control agent having at least one particle size distribution. Preferably, the red dye comprises an anthracene or anthraquinone-based dye and the fuel comprises a sugar or mixture of sugars.

21 Claims, 1 Drawing Sheet

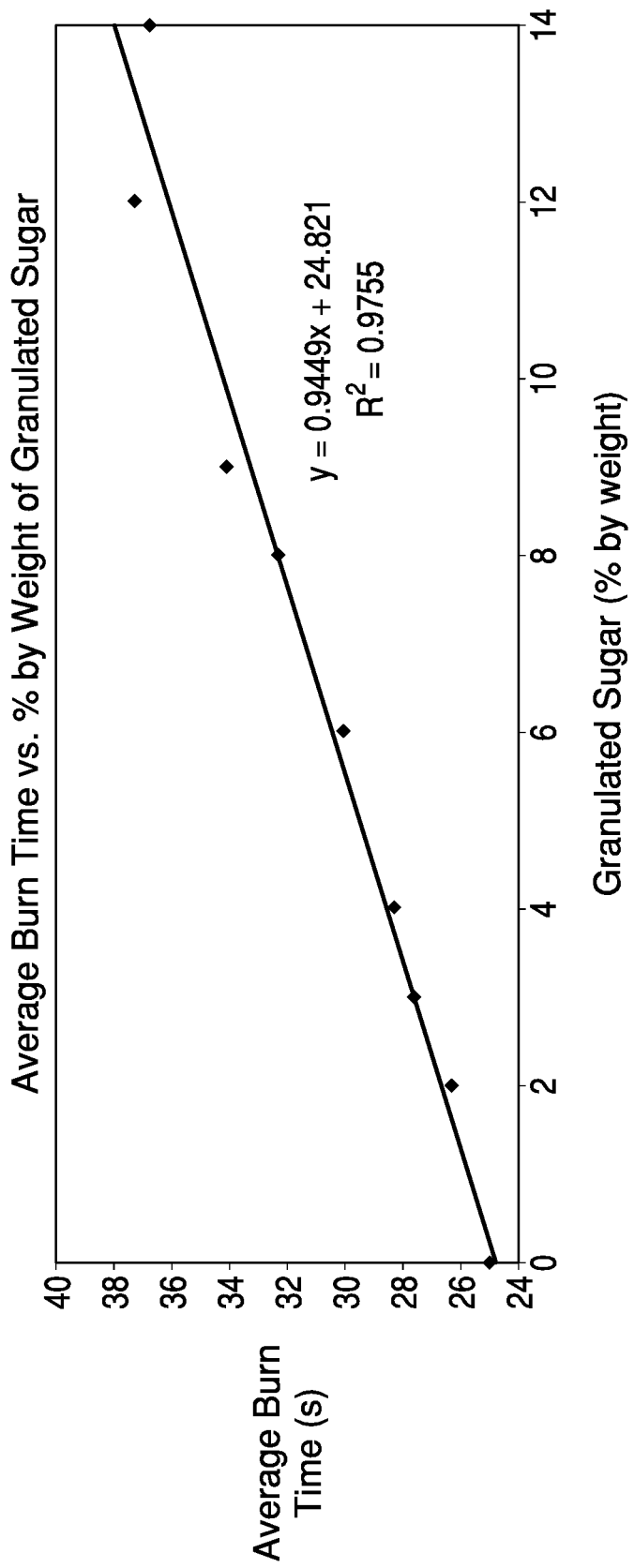

LOW TOXICITY, ENVIRONMENTALLY FRIENDLY RED SMOKE GENERATING COMPOSITION AND METHOD OF MAKING THE SAME

GOVERNMENT INTEREST

The invention described herein may be manufactured, used and licensed by or for the United States Government.

FIELD OF THE INVENTION

The purpose of this pyrotechnic formulation is to generate low toxicity red smoke using an environmentally benign red dye with a unique sublimating formulation.

BACKGROUND OF THE INVENTION

Smoke generating compositions which are used by the military to produce red smoke typically comprise a formulation which includes sulfur as a fuel, potassium chlorate as an oxidizer, and red dye. Coolants such as magnesium carbonate and binder such as nitrocellulose or polyvinyl alcohol may also be included. Binders assist in maintaining the smoke generating formulation in a compact form so that it may be used in the production of, for example, smoke generating grenades.

The requirements for an effective colored-smoke composition include the following.

The composition must produce sufficient heat to vaporize the dye, as well as produce a sufficient volume of gas to disperse the dye into the surrounding environment.

The composition must ignite at a low temperature and continue to burn smoothly at a low temperature (well below 1000° C.). If the temperature is too high, the dye molecules will decompose, and the generated smoke's color quality and volume will deteriorate. The use of metal fuels should be avoided in colored smoke generating compositions because of the high reaction temperatures they may produce.

Although a low ignition temperature is required, the smoke-generating composition must be stable during manufacturing and storage over the expected range of ambient temperatures.

The molecules creating the colored smoke must be of low toxicity (including low carcinogenicity). Further, they must readily sublime without decomposition at the temperature of the pyrotechnic reaction to yield a dense smoke of good color quality.

In various contexts, it is desirable to have the capability to produce smoke suitable for a wide variety of applications. For example, the ability to produce smoke at a particular location may provide the basis for a remote signaling system. Such a system may have application in search and rescue operations and in military exercises. Smoke of a particular color and density may also be desirable for training purposes. For example, in order to train firefighters, it would be advantageous to simulate specific types of smoke produced by various fire conditions. For individuals working in a fire-prone environment, such as on an aircraft or ship, it would also be desirable to have the capability of simulating smoke produced by a fire in order to provide a realistic fire drill.

Smoke can be also used as a marker for various purposes. A smoke marker can be seen from substantial distances, both from the ground and from the air. Accordingly, a smoke marker would be useful in military operations, search and rescue, certain types of industrial projects, or in any other situation in which it is important to find and mark a particular location.

In a military context, the need for smoke-producing devices and compositions is well appreciated. Not only can smoke be used as a marker for search and rescue, but smoke may also be used to mark a particular target. It can also be used as a marker to determine the position of specific personnel and equipment.

Importantly, smoke can also be used to obscure vision. A smoke shield can be very helpful in conducting military operations in order to prevent adverse forces from obtaining a clear view of the operations. For example, it may be desirable to use a vision obscuring smoke in order to move troops and equipment under at least partial cover.

Various types of smoke-producing compositions and devices are presently known. It is known how to judiciously select the components of a smoke-producing composition that uses a sublimable organic coloring medium. By considering the kinetics of combustion and the desired yield of colored smoke, conventional smoke-producing compositions require a strongly exothermic composition but struggle to limit the degradation of the coloring medium by combustion. A weakly exothermic composition is unsuitable because it permits only a minimal percentage of coloring medium and furnishes only a very mediocre smoke yield that is hardly visible, especially when there is a cloudy or dark sky. A weakly exothermic composition is also difficult to ignite to initiate smoke emission.

It is also known that it is advantageous to adjust the combustion speed, because a rapid combustion provokes the destruction of the coloring medium or liberates the smoke too briefly or in a non-workable manner. In contrast, a slow combustion produces a smoke yield of minimal consequence and tends toward self-extinction of the combustion process. It is known to consider the effects of the reaction thermodynamics by making an appropriate choice of the components of the composition and by the conditions of compression of the composition.

However, most existing smoke-producing compositions have severe limitations. One of the limitations is that of toxicity. Many smoke-producing compositions incorporate materials that are severely toxic or become irritants when subjected to the heat necessary to produce smoke.

A variety of dyes have been used in colored smoke mixtures. Many of these dyes are presently under investigation for carcinogenicity and other potential health hazards.

The materials that work best in colored smokes have several properties in common:

Volatility: The dye must undergo a phase change to the gas state upon heating, without also undergoing substantial decomposition. Only low molecular weight dyes (less than 400 grams/mole) are usually used because volatility typically decreases as molecular weight increases. Salts do not work well: ionic species generally have low volatility because of their strong inter-ionic attractions within the crystalline lattice. Therefore, functional groups such as —COO— (carboxylate ion) and —NR3+(a substituted ammonium salt) should be avoided.

Chemical stability: oxygen-rich functional groups ($-NO_2$; $-SO_3H$) should be avoided. At the typical reaction temperatures of smoke compositions, these groups are likely to release their oxygen, leading to oxidative decomposition of the dye molecules. Groups such as $-NH_2$ and —NHR (amines) are used, but potentially dangerous oxidative coupling reactions can occur in an oxygen rich environment.

Previous dyes for military markers and grenades are commonly polycyclic or aromatic amino, hydroxyl, azo and keto compounds, in which unsaturation conjugated with the aromatic structure. Such compounds are known to cause chromosome mutations, which may lead to cancer. Coloring agents for new munitions are chosen to minimize potential carcinogenicity, which increases their cost, but allows use and recycling of the dyes without high health risks.

The current M18 red smoke formulation uses potassium chlorate, sulfur and a red dye to generate a red smoke signal. While effective, the products generated are not environmentally friendly and toxicity testing on the red dye has been shown it to be more toxic compared to other dyes. Upon reaction the sulfur in the formulation creates toxic and environmentally harmful sulfur dioxide products which have known toxic characteristics. The sulfur also creates a safety issue during production, due to friction and impact sensitivity when intimately mixed with potassium chlorate.

Prior art colored smoke formulations have generally employed the use of mixtures containing a fuel, an oxidizer, and a dye. The principle behind the use of such formulations lies in the reaction between the fuel and oxidizer, and the accompanying release of a large amount of energy during the reaction. The exothermic reaction releases the energy contained in the bonds of the highly structured fuel molecule as heat. This causes the dye component of the formulation to undergo a series of phase transitions from a solid to a liquid and ultimately to a gas. However, if the temperature of the fuel-oxidizer reaction is too high, the dye will degrade, and the quantity and color quality of smoke generated will be unsatisfactory.

Conventionally, the dye exists as a solid crystal at standard temperature and pressure. When heat generated by a fuel-oxidizer reaction is applied to the solid crystal, dislocations of the molecules occur within the crystalline lattice. As molecules of the dye become detached from the central lattice, a liquid is formed. As more heat energy is applied, the individual molecules of the dye begin to move more rapidly, and this molecular activity is responsible for the transition of the dye molecules from the liquid phase to the gas phase.

Although heat is required for the dye to undergo the essential phase changes to produce colored smoke, individual molecules of the dye are also subject to degradation at elevated temperatures. If the molecular structure of the dye is subject to forces and energies that are great enough to cleave the molecule's bonds, changes in smoke color or loss of color properties are likely to occur.

Other known compositions have the drawback of burning at temperatures that are too high (600 to 800° C.) or leave too many carbonaceous residues, which are impermeable to the dye molecules in the gas phase. These conditions cause the destruction of the smoke-producing components and therefore demonstrate poor effectiveness in producing colored smokes. Another drawback may be the rapid ascent of the smoke because of the smoke's high temperature, which causes the smoke to dissipate too quickly for the desired effect to be achieved.

Various smoke generating compositions have been made in the past. US 2015/0329437 to Hultman discloses a pyrotechnic composition including a fuel, an oxidizer, flow rate control agents and oleoresin capsicum as an irritant. The composition is useful in crowd control products. The composition comprising approximately 13% to 24% potassium chlorate, 3% to 22% baker's sugar, 6% to 22% magnesium carbonate, 20% to 40% terephthalic acid, 2% to 28% dye, 1% to 25% magnesium stearate as the rate controlling agent, and 20% to 35% nitrocellulose as the binding agent. However, the dye composition is not addressed, and it is uncertain that such composition would meet the M18 smoke grenade standards, be less toxic, and having a controlled burn rate.

GB 1139761 to Cross discloses a riot-controlled composition comprising 40% of o-chloro benzal malonitrile, 27% potassium chloride, 18% of sugar, 12% of magnesium carbonate, and 3% of cellulose nitrate. Similar to Hultman, the dye ingredient is not addressed, and it is uncertain that such composition would have controlled burn or meet the M18 grenade standard.

RU2369590 to Sergiveech, et al. discloses pyrotechnic composition of color smoke containing potassium chlorate as an oxidizer, thiourea as fuel—gasifier, dicyandiamide, fluorine rubber SKF-32, lamellar graphite of Piv grade as organic dye-monomethyl aminoanthraquinone, red C fat-soluble dye, fat-soluble red anthraquinone or hexachlorobenzene dye.

U.S. Pat. No. 6,558,487 to Tadros, et al. discloses a smoke generating composition including at least one smoke generating material and an effective amount of a polymerized monosaccharide or disaccharide both as a binder and a fuel. In the preparation of colored smoke generating compositions, potassium chlorate, magnesium carbonate and sucrose are typically combined with a dye such as solvent yellow 33 (for the production of yellow smoke) and solvent yellow 33 combined with solvent green 3 (for the production of green smoke). Further, from about 12 to 100% of the sucrose is polymerized, formed into a solution and then sprayed over the remaining components to bind the components together into a smoke generating composition. U.S. Pat. No. 6,558,487 does not address the issue of controlled burn, or the toxicity associated with the dye.

US 2014/0238258 to Stoenescu discloses a colored pyrotechnic smoke-producing composition that has an oxidizer, a sugar fuel, a flame retardant, a dye, a coolant, and a binder. The flame retardant is one or more nitrogen-rich compounds. The composition may be in pelletized form, or in the US form of a solid charge. Similar to other prior art, US 2014/0238258 also does not address the issue of controlled burn, or the toxicity associated with the dye.

However, many such compositions are also corrosive and damaging to both electronic and mechanical equipment. Finally, some compositions produce an excess of heat and flame, again limiting their usefulness and requiring that additional safety measures be taken. For these reasons, conventional smoke-producing compositions are found to be inadequate.

Therefore, there is a need to create comparable signaling color and meet the burn time requirements from the M18 grenade specification. Specifically, there is a need to replace existing red dye with at least one red dye that has been shown to be less toxic. There is also a need to replace the sulfur fuel with an environmentally friendly and less toxic alternative.

BRIEF DESCRIPTION OF THE DRAWING

The invention together with other objects, features, aspects, and advantages thereof will be clearly understood from the following in conjunction with the accompanying drawing.

FIG. 1 depicts the burn time of a smoke grenade relative to the amounts of incorporated granulated sugar.

SUMMARY OF THE INVENTION

The present invention is directed to a novel, environmentally friendly and low toxicity red smoke generating composition comprising at least one red dye, a coolant, an oxidizer, a binder, and a non-sulfur particulate fuel that is also a burn-control agent having at least one particle size distribution.

In a further aspect of the present invention, there is provided a method of producing the red smoke generating composition and incorporating the composition into a smoke grenade.

DETAILED DESCRIPTION OF THE EMBODIMENTS OF THE INVENTION

The present invention is directed toward a novel environmentally-friendly and low-toxicity red smoke generating composition comprising at least one red dye, and a method of manufacturing the novel environmentally-friendly and low-toxicity red-smoke-producing composition of the present invention.

The invention relates to a smoke-producing pyrotechnic composition and more particularly, is related to generally cool-burning, non-toxic and non-corrosive smoke producing compositions, which incorporate:

Oxidizer—a presently preferred oxidizer is potassium chlorate ($KClO_3$).

Non-Sulfur Fuel—a low energy, sugar-based fuel that also minimizes heat and flame produced. Such fuels are free of sulfur and are selected from the group consisting of starch, dextrose, lactose, sucrose, and mixtures thereof.

Red Dye—a sublimable and/or evaporative organic coloring substance which produces a red smoke as a result of the dye undergoing a phase change.

Coolant—coolant prevents excessive decomposition of the dye, and also acts as a buffer for the $KClO_3$. Suitable coolant is selected from sodium bicarbonate, magnesium carbonate, and the mixtures thereof. Preferably the coolant is magnesium carbonate.

Non-Sugar Binder—nitrocellulose or a polymer binder.

Additives (optional)—terephthalic acid or stearic acid.

An ideal dye material for this application transforms "sublimes" directly from the solid phase to the gas phase with little or no intermediate liquid phase. The direct transformation to a gas enhances the likelihood of the dye molecules escaping from the solid matrix made of fuel, oxidizer, and dye to the external environment without the dye molecules reaching an undesirably high temperature. Thus, dyes are sought for the composition that have the property of sublimation at increased temperatures and normal pressures.

The dyes, which may be used in this invention corresponding to the color standard FED-STD-595C color chip, are listed by the Society of Dyers and Colorists in dye classification materials according to chemical structure, and include the following:

The present inventive red smoke generating composition includes at least one anthracene or anthraquinone-based red dye selected from Table 1. The red dye is selected from the group consisting of: 1-(Methylamino)anthraquinone (solvent red 111); 1-(Cyclohexylamino)anthracene-9,10-dione (solvent red 168); 1-Isopropylamino-9,10-anthraquinone (solvent red 169); 1,5-bis[(3-methylphenyl)amino]anthraquinone (solvent red 207); and mixtures thereof. Preferably, the red dye is selected from the group consisting of 1-(Cyclohexylamino)anthracene-9,10-dione (solvent red 168); 1-Isopropylamino-9,10-anthraquinone (solvent red 169); and mixtures thereof. Specifically, in the form of dry weight, the inventive red smoke generating composition includes at least one red dye in the amount of 27 to 50 wt. %, and preferably about 35 wt. % of the red smoke composition.

The compositions of the present invention also incorporate at least one binder to provide the desired consistency. A binding agent from the group of the halogen-free thermoplastics can be used for the physical stabilization of the mixture of the pyrotechnic smoke-producing composition. The binding agent is selected from the group consisting of polyvinyl acetate, polyvinyl alcohol, polyvinyl butyral, polyvinyl ester, polyvinyl ether, or mixtures thereof. Preferably, the binder is either nitrocellulose or polyvinyl alcohol as they result in a decreased solid residue within the burned grain and produce only a small energy output upon combustion. This is important in avoiding very high-energy outputs, high temperatures, and flames, which render smoke producing compositions dangerous and difficult to handle. Nitrocellulose, if used, is used in a solution of 6 to 12% nitrocellulose dissolved in acetone. Accordingly, no sugar substance is used as a binder, as sugar in excess to the fuel of the present invention may cause insufficient burn and reduce color strength.

The composition of the present invention also includes one or more oxidizer compounds. It is found that potassium chlorate ($KClO_3$) is an efficient oxidizer and produces good results when coupled with the fuel and previously mentioned nitrogen-rich compounds.

The present invention includes a fuel. The fuel is preferably a relatively low energy fuel similar to the binder. It is also preferred that the fuel produce gaseous reaction prod-

TABLE 1

Chemical compositions of dyes suitable for use in in red smoke-producing compounds of the present invention

| CI Name | CAS # | Trade Name | Chemical Name |
|---|---|---|---|
| Solvent Red 1 | 1229-55-6 | Anasol Red SG | amethoxybenzenazo-β-naphthol |
| Solvent Red 3 | 6535-42-8 | Anasol Brown DPN | 4-(4-ethoxyphenyl)azo-1-naphthol |
| Solvent Red 4 | 2653-64-7 | Anasol Bordeaux DNN | 1-(1-Naphthylazo)-2-naphtnol |
| Solvent Red 23 | 85-86-9 | Anasol Scarlet Y | 1-(4-(Phenyldiazenyl)phenyl)azonaphlen-2-ol |
| Solvent Red 24 | 85-83-6 | Anasol Red OB | 1-((2-Methy1-4-((2-methlphenyl)azo)phenyl)azo)-2-naphthalenol |
| Solvent Red 26 | 4477-79-6 | Anasol Red DTXB | 1-[[2,5-dimethyl-4-[[(2-methylphenyl)azo]phenyl]azo]-2-Naphthalenol |
| Solvent Red 27 | 1320-06-5 | Anasol Red DXXN | 1-[[4-[(dimethylphenyl)azo]dimethylphenyl]azo]-2-Naphthalenol |
| Solvent Red 49 | 509-34-2 | Anasol Red RBB | 9'-(9H)xanthen]-3-one,3',6'-bis(diethylamino)-Spiro[isobenzofuran-1(3H) |
| Solvent Red 52 | 81-39-0 | Anasol Red BL | 3-Methyl-6-(p-toluidino)-3H-dibenz[f,ij]isoquinoline-2,7-dione |
| Solvent Red 111 | 82-38-2 | Anasol Red KMA | 1-(Methylamino)anthraquinone |
| Solvent Red 135 | 71902-17-5 | Anasol Red GG | 8,9,10,11-Tetrachloro-12-phthaloperinone |
| Solvent Red 164 | 71819-51-7 | C.I. Solvent Red 164 | 1-[[2,5-dimethy1-4-[(2-methylphenl)azo]-phenyl]azo]-2-naphthol |
| Solvent Red 168 | 71832-19-4 | Abcol red 168 | 1-(Cyclohexylamino)anthracene-9,10-done |
| Solvent Red 169 | 27354-18-3 | AMaplast Red PC | 1-isopropylamino-9,10-anthraquinone |
| Solvent Red 179 | 6829-22-7 | Macrolex Red E2G | 14H-Benz(4,5)isoquino(2,1-a)perimidin-14-one |
| Solvent Red 207 | 10114-149-5 | Anasol Red CHA | 1,5-bis[(3-methylphenyl)amino]anthraquinone | ucts capable of carrying the smoke producing agent into the environment. Preferably the fuel is a sugar. Some suitable fuels include starch, dextrose, and polyhydroxylic compounds such as lactose and sucrose. It has been found that depending on the choice of the red dye, an applicable fuel is either one type of sugar having one particle size distribution, or a mixture of sugars having two distinct particle size distributions to effectively control the burn time of the red smoke generating composition from 50 to 90 seconds, an acceptable range for an M18 smoke grenade. Preferably, if one type of sugar is used, the sugar fuel is in the amount of 20 to 50 wt. % of the red smoke composition, and comprises sucrose having a particle size of 10 to 100 microns (10×). Most preferably, the 10× sucrose comprises about 28 wt. % of the red smoke composition. If a mixture of sugars is used in the red smoke composition, the sugar comprises a mixture of sucrose having a particle size of 10 to 100 microns (10×), and sucrose having a particle size of 300 to 650 microns (granulated). Preferably, the 10× sugar is present in the amount of 10 to 25 wt. % of the red smoke composition, and the granulated sugar (300 to 650 microns) is present in the amount of 10 to 25 wt. % of the red smoke composition. Most preferably, the 10× sucrose comprises about 14 wt. % of the red smoke composition, and the granulated sucrose also comprises about 14 wt. % of the red smoke composition. The ratio of the 10× sugar to the granulated sugar may range from 1:14 to 14:1.

Other materials are also added to produce specific desirable results. One suitable material is magnesium carbonate. Magnesium carbonate acts as a buffer, which prevents autocatalytic decomposition of the $KClO_3$. Magnesium carbonate also functions as a coolant when the smoke-producing composition combusts. Alternatively, sodium bicarbonate can be used. Another useful additive in the present invention is aluminum. In some cases, atomized aluminum can provide additional thermal conductivity within the composition. This results in more uniform heat transfer and ignition of the fuel.

In general, the ingredients of the composition may be within the ranges indicated in Table 2:

TABLE 2

Ingredient ranges of the pyrotechnic smoke producing composition of the present invention

| Materials | Percent by Weight (in dry state), % |
| --- | --- |
| Potassium Chlorate | 18 to 35 |
| Sugar (Fuel) | 20 to 50 |
| Dye | 27 to 50 |
| Magnesium Carbonate | 8 to 25 |
| Nitrocellulose | 1 to 5 |

It must be noted that essentially no flame retardant is used, and specifically, no nitrogen-based flame retardant is used. Flame retardants would adversely affect the red color strength of the smoke, as well as prolong the burn time to outside of the 50 to 90 second range for the M18 smoke grenade. The burn rate is controlled by the coolant removing the need of a flame retardant.

EXAMPLE

A series of mixtures were made using white smoke formulation as a baseline (Table 3), replacing part or all of the 10× sugar having an average particle size of 60.91 microns, with granulated sugar having an average particle size of 330.82 microns. The ratio of 10× to granulated sugar varied between 14:0 and 0:14 while the other components remained constant throughout the experiments with respect to the quantity and lot. A Sympatec HELOS laser diffraction particle size analyzer (Sympatec, Clausthal, Germany) was used to measure particle size of the sugar.

TABLE 3

Baseline Pyrotechnic Smoke Composition

| Materials | Percent by Weight % |
| --- | --- |
| $KClO_3$ | 23 |
| Sugar (sucrose, 10X) | 14 |
| Terephthalic Acid (TA) | 43 |
| Pentaerythritol (PE) | 15 |
| $MgCO_3$ | 3 |
| Polyacrylic Rubber | 2 |

Typical pyrotechnic mixing procedures were observed when blending components for all mixtures in a Hobart planetary mixer (Hobart Corporation; Troy, Ohio). Acetone was used as the solvent for the polyacrylic rubber binder and as a mixing medium. The polyacrylic rubber was dissolved in a minimum amount of acetone (approximately 500 ml) before being used to wet the other components of the mixture. Acetone was added as needed to wet the other components of the mixture and to achieve the proper consistency for mixing. Mixing was accomplished using an electrically grounded planetary mixer. When sufficient acetone had evaporated leaving the residual material a damp powder, the mixture was removed from the mixing bowl and placed in a tray. The mixture was then transported to a forced air oven and allowed to dry for a minimum of 24 hours at 140° F.

Ten grams of the dried mixture were hand pressed into small aluminum containers using the step-faced ram. The step on the ram had a depth of 0.375 inch. and a diameter of 0.35 inch. The dimensions of the aluminum container were 1.13 inches inner diameter and 2.21 inches in depth. One gram of the ignition composition given in Table 4 was added to the indentation left by the step-faced ram. The aluminum container was then placed in a Carver Laboratory Press and consolidated with the flat faced ram at 1800 lb. dead load. Based on the dimensions of the container this consolidation force was equivalent to 1800 psi. A container lid with a centered 0.1875 in. diameter port was attached using a sheet metal screw. Initiation was achieved by a small piece of quickmatch (MIL-Q-378B).

TABLE 4

Ignitions Composition Used in Experiments

| Materials | Percent by Weight % |
| --- | --- |
| $KNO_3$ | 67.35 |
| Ti | 11.23 |
| Al | 8.16 |
| Si | 6.12 |
| S | 2.04 |
| C | 5.10 |

Table 5 displays the various sugar ratios in the formulation and burn times for the experiments conducted. A minimum of ten trials was performed for each formulation.

TABLE 5

Burn Times Resulting from Increasing Percentage of Granulated Sugar

| Granulated Sugar (% Weight) | 10X Confectioners' Sugar (% Weight) | Average Burn(s) |
|---|---|---|
| 0 | 14 | 25.05 |
| 2 | 12 | 26.38 |
| 3 | 11 | 27.68 |
| 4 | 10 | 28.33 |
| 6 | 8 | 30.11 |
| 8 | 6 | 32.55 |
| 9 | 5 | 34.14 |
| 12 | 2 | 37.33 |
| 14 | 0 | 36.82 |

Table 5 and FIG. 1 clearly show that when the 10× was replaced with granulated sugar, the burn time was decreased by 32% in this experimental configuration. All test items displayed reliable ignition and produced smoke at a rate consistent with the formulation. As evidenced by a $R^2$ value of 0.9755 in FIG. 1, a linear approximation of the burn time as a function of sugar ratio served as a reasonable model.

Full Scale Production

For full-scale production the ingredients were mixed using a Glatt fluidized air bed mixer, with a polyvinyl alcohol "PVA" binder in a water solution. Specifically, the ingredients were weighed to ±0.1 g of the desired amount. The sugar, dye, magnesium carbonate, and potassium chlorate were added to the bowl of the Glatt mixer. After 5 minutes of the mixing, the binder was added to the Glatt mixer bowl via spraying for 15 minutes. The mixing operation produced powder and small granules of the smoke composition. The powder was either stored or taken to the pressing operation immediately.

The formulations prepared in the Glatt mixer were then pressed and loaded as follows:
  Press 1: 100 g of the smoke composition at 15,000 lb dead load;
  Press 2: 100 g of the smoke composition at 15,000 lb dead load; and
  Press 3: 100 g of the smoke composition and 5 g of a starter composition at 15,000 lb dead load.

Five grenades were produced for this phase of testing, and were loaded in the same manner as the standard M18 grenades. Four slugs were pressed at about 5500 lb maximum and reconsolidated at 8500±500 lb. Each slug was approximately 65 g. The grenades were loaded in the following order: smoke slug, smoke slug, starter patch, smoke slug, starter patch, and smoke slug. The loading was completed at 1500 to 2500 psi, preferably 2300 psi.

Table 6 shows the formulation of the five grenades. Two 1000 g batches of formulation were produced. The mix was pressed into 65 g slugs.

TABLE 6

Primary Red Formulation

| Material | Amount (%) | Amount (g) |
|---|---|---|
| Solvent Red 169 | 35.0 | 350.0 |
| Potassium chlorate | 21.0 | 210.0 |
| Magnesium carbonate | 16.0 | 160.0 |
| Sugar, 10X | 28.0 | 280.0 |
| PVA (BMS CEL 06325) | 2.0 | 333.0 |

The grenades produced with the primary red formulation had an average burn time of 55.6±2.3 s. No flaming occurred during this test.

A secondary red smoke formulation was also produced and tested using the above mentioned methods. Two 1000 g batches of this type were made using the formulation listed in Table 7.

TABLE 7

Secondary Red Formulation

| Material | Amount (%) | Amount (g) |
|---|---|---|
| Solvent Red 168 | 35.0 | 350.0 |
| Potassium chlorate | 21.0 | 210.0 |
| Magnesium carbonate | 16.0 | 160.0 |
| Sugar, 10X | 14.0 | 140.0 |
| Sugar, granulated | 14.0 | 140.0 |
| PVA (BMS CEL 06325) | 2.0 | 333.0 |

The grenades produced with the secondary red formulation had an average burn time of 71 seconds.

An Alternative secondary red formulation was also made:

TABLE 8

Alternative Red Formulation

| Material | Amount (%) | Amount (g) |
|---|---|---|
| Solvent Red 168 | 30.0 | 90.0 |
| Potassium chlorate | 21.0 | 63.0 |
| Magnesium carbonate | 21.0 | 63.0 |
| Sugar, 10X | 14.0 | 42.0 |
| Sugar, granulated | 14.0 | 42.0 |
| Nitrocellulose binder | 2.0 | 6.0 |

The average burn time for the above formulation was 61 seconds.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The invention claimed is:

1. A low-toxicity red smoke generating composition, comprising:
   an oxidizer;
   a particulate non-sulfur fuel having a particle size range of 10 to 100 microns, and wherein said fuel further includes second particles having a particle size range of 300 to 650 microns;
   at least one anthracene or anthraquinone-based red dye;
   a coolant; and
   a non-sugar binder.

2. The composition of claim 1, wherein said oxidizer is potassium chlorate.

3. The composition of claim 1, wherein said fuel is a sugar selected from the group consisting of dextrose, lactose, sucrose, and mixtures thereof.

4. The composition of claim 3, wherein said fuel is sucrose.

5. The composition of claim 1, wherein said fuel comprises a mixture of a first sugar comprising sucrose (10×) having a particle size range of 10 to 100 microns, and a second sugar comprising granulated sucrose having a particle size range of 300 to 650 microns.

6. The composition of claim 1, wherein said coolant is selected from the group consisting of sodium bicarbonate, magnesium carbonate, and mixtures thereof.

7. The composition of claim 1, wherein said binder is selected from the group consisting of nitrocellulose, polyvinyl acetate, polyvinyl alcohol, polyvinyl butyral, polyvinyl ester, polyvinyl ether, and mixtures thereof.

8. The composition of claim 7, wherein said binder is selected form the group consisting of nitrocellulose, polyvinyl alcohol, and mixtures thereof.

9. The composition of claim 1, wherein said red dye is selected from the group consisting of 1-(Methylamino) anthraquinone (solvent red 111); 1-(Cyclohexylamino)anthracene-9,10-dione (solvent red 168); 1-Isopropylamino-9,10-anthraquinone (solvent red 169); 1,5-bis[(3-methylphenyl)amino]anthraquinone (solvent red 207); and mixtures thereof.

10. The composition of claim 9, wherein said red dye is selected from the group consisting of 1-(Cyclohexylamino) anthracene-9,10-dione (solvent red 168); 1-Isopropylamino-9,10-anthraquinone (solvent red 169); and mixtures thereof.

11. The composition of claim 1, wherein said composition comprises said oxidizer in an amount of 18 to 35 wt. %, said fuel in an amount of 20 to 50 wt. %, said red dye in an amount of 27 to 50 wt. %, said coolant in an amount of 8 to 25 wt. %, and said binder in an amount of 1 to 5 wt. %.

12. The composition of claim 1, wherein said oxidizer comprises potassium chlorate in an amount of about 21 wt. %, said red dye comprises 1-Isopropylamino-9,10-anthraquinone (solvent red 169) in an amount of about 35 wt. %, said fuel comprises a mixture of sucrose (10×) and granulated sucrose, said fuel in amount of about 28 wt. %, said coolant comprises magnesium carbonate in an amount of about 16 wt. %, and said binder comprises polyvinyl alcohol or nitrocellulose in an amount of about 2 wt. %.

13. The composition of claim 1, wherein said oxidizer comprises potassium chlorate in an amount of about 21 wt. %, said red dye comprises 1-(Cyclohexylamino) anthracene-9,10-dione (solvent red 168) in an amount of about 35 wt. %, said fuel comprising sucrose (10×) in an amount of about 14 wt. % and granulated sucrose having a particle size of 350 to 600 microns in an amount of about 14 wt. %, said coolant comprises magnesium carbonate in an amount of about 16 wt. %, and said binder comprises polyvinyl alcohol or nitrocellulose in an amount of about 2 wt. %.

14. The composition of claim 1, wherein said composition is essentially free of nitrogen-based flame retardants.

15. The composition of claim 1, wherein said composition is adapted for use in a smoke producing grenade.

16. A process for producing a low-toxicity red smoke generating grenade, comprising:
mixing an oxidizer; a non-sulfur fuel, wherein said fuel comprises a mixture of sucrose having a particle size range of 10 to 100 microns and further includes sucrose having a particle size range of 300 to 650 microns; at least one anthracene or anthraquinone-based red dye; a coolant; and a non-sugar binder to form a mixture;
loading said mixture into a body as a solid charge;
loading an ignition composition into said body;
sealing said body; and
attaching an igniter to said body to form a smoke grenade.

17. The process of claim 16, wherein said mixing is done using a planetary mixer or a fluidized bed mixer.

18. The process of claim 16, wherein each of said loading was completed at 1500 to 2500 psi, or about 15,000 lb dead load.

19. The process of claim 16, wherein said mixture comprises said oxidizer in an amount of 18 to 35 wt. %, said fuel in an amount of 20 to 50 wt. %, said red dye in an amount of 27 to 50 wt. %, said coolant in an amount of 8 to 25 wt. %, and said binder in an amount of 1 to 5 wt. %.

20. The process of claim 16, wherein said red dye is selected from the group consisting of 1-(Cyclohexylamino) anthracene-9,10-dione (solvent red 168); 1-Isopropylamino-9,10-anthraquinone (solvent red 169); and mixtures thereof.

21. The process of claim 16, wherein said mixture is essentially free of nitrogen-based flame retardants.

\* \* \* \* \*